United States Patent [19]

Kondo et al.

[11] Patent Number: 4,760,877
[45] Date of Patent: Aug. 2, 1988

[54] AIR CONDITIONER WITH MOTOR CONTROLLED DOOR

[75] Inventors: Shiro Kondo; Michitada Akazawa; Akinori Ito, all of Furukawa, Japan

[73] Assignee: Alps Electric Co., Ltd., Japan

[21] Appl. No.: 914,285

[22] Filed: Oct. 2, 1986

[30] Foreign Application Priority Data

Oct. 4, 1985 [JP] Japan ................................ 60-220365

[51] Int. Cl.$^4$ ................ F25B 29/00; B60H 3/00; F16K 31/02
[52] U.S. Cl. .................................... 165/24; 165/42; 165/43; 98/2.01; 251/129.04; 62/161
[58] Field of Search ...................... 62/161; 98/2.01; 251/129.04; 165/24, 25, 42, 43

[56] References Cited

U.S. PATENT DOCUMENTS

| | | | |
|---|---|---|---|
| 1,959,786 | 5/1934 | Hodgkinson | 251/129.04 |
| 2,386,569 | 10/1945 | Parsons | 251/129.04 |
| 2,544,948 | 3/1951 | Caldwell | 251/129.04 |
| 4,481,451 | 11/1984 | Kautz et al. | 251/129.04 |

FOREIGN PATENT DOCUMENTS

| | | | |
|---|---|---|---|
| 2467430 | 5/1981 | France | 98/2.01 |
| 2511522 | 2/1983 | France | 98/40.24 |
| 0087613 | 7/1980 | Japan | 98/2.01 |
| 0182511 | 11/1982 | Japan | 98/2.01 |

Primary Examiner—Albert W. Davis, Jr.
Assistant Examiner—John K. Ford
Attorney, Agent, or Firm—Guy W. Shoup; Glenn F. Ostrager; Leighton K. Chong

[57] ABSTRACT

A device for moving a door provided in an air conditioner upstream of an area in which cold air and hot air are mixed to produce a stream of air having an appropriate temperature includes an electric motor which is rotatable in either direction for rotating the door in either direction. An electric switch is connected to the motor for controlling its operation. The switch is reciprocatively slidable by a lever. A cam follower is connected to the motor reciprocatively slidably in parallel to the switch for changing an electrical circuit connection between the switch and the motor. The cam follower is connected to the motor by a wire and the door is also connected to the motor by a wire. The switch has a rotatable arm which is engageable with the cam follower. The arm has a neutral position in which it is engaged with the cam follower so that no electric current may be supplied to the motor. The arm is rotatable in two opposite directions from its neutral position. If it is rotated in either direction, the motor is rotated for moving the cam follower toward the switch until the arm is brought back to its neutral position.

4 Claims, 6 Drawing Sheets

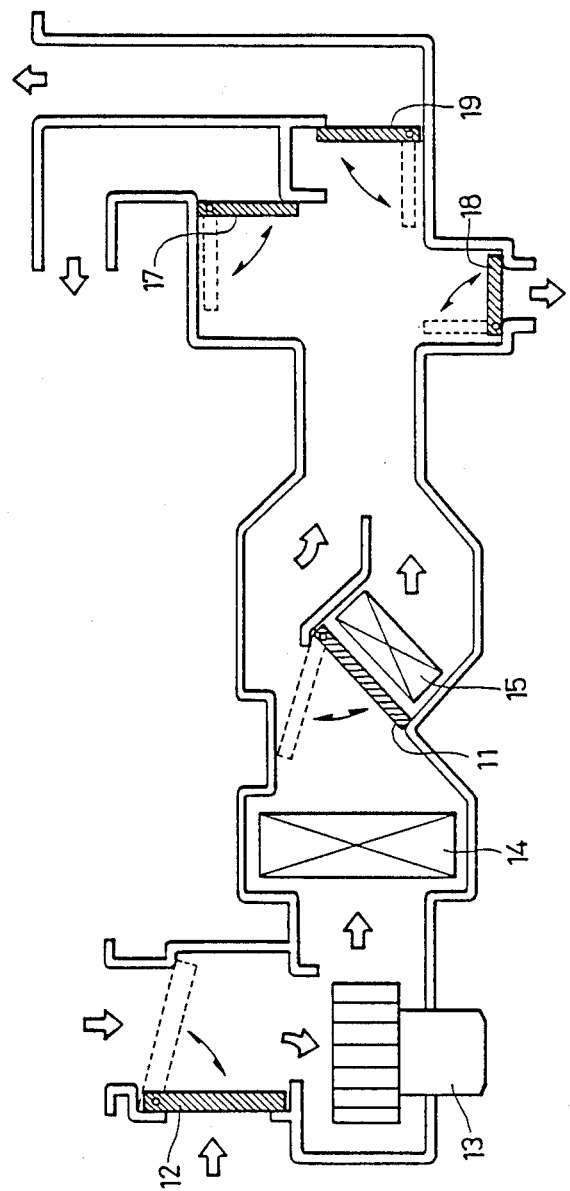

AIR CONDITIONER WITH MOTOR CONTROLLED DOOR

BACKGROUND OF THE INVENTION

1. Field of the Invention

This invention relates to an air conditioner for an automobile, or the like. More particularly, it is an air conditioner having a door which can be opened at a variable angle to produce an appropriate mixture of cold air and hot air having a desired temperature.

2. Description of the Prior Art

The prior art will be described with reference to FIGS. 4 to 6 of the accompanying drawings. Referring first to FIG. 4, there is generally shown an air conditioner which is installed in an automobile. It includes a number of doors which are provided for different purposes. An air intake door 12 is provided at the inlet of the air conditioner. It is movable between a first position at which it allows air to be drawn from the inside of the automobile into the air conditioner and a second position at which it allows air to be drawn from the outside of the automobile into the air conditioner. The air flowing into the air conditioner past the door 12 is directed by a fan motor 13 to an evaporator 14. The evaporator 14 cools the air and delivers cold air. Two air passages are provided downstream of the evaporator 14. The air leaving the evaporator 14 can flow into both of these air passages. The cold air leaving the evaporator 14 and flowing into one of the air passages remains cold when leaving the air passage. A heater 15 is provided in the other air passage for heating the cold air coming from the evaporator 14 and delivering hot air. The two passages meet at the outlets thereof to produce a mixture of the cold air and the hot air having an appropriate temperature. An air mixing door 11 is provided at the inlets of the two passages. It is movable between a first position at which it closes one of the air passages and a second position at which it closes the other passage. The door 11 is provided for varying the proportion by volume of the cold air flowing into one of the air passages and the cold air flowing into the other air passage. Therefore, the temperature of the air mixture obtained downstream of the two air passages depends on the proportion by volume of the cold air leaving one of the passages and the hot air leaving the other passage, i.e., the degree of opening of the door 11 relative to each passage. Three doors are provided at the outlet of the air conditioner. They are a door 17 which opens or closes a port leading to a vent, a door 18 which opens or closes a port connected to the floor of the automobile, and a door 19 which opens or closes a port leading to a window defroster. The doors 17 to 19 are selectively opened to enable the delivery of a stream of air having an appropriate temperature to the corresponding place or places.

The doors 12 and 17 to 19 are all simple in operation. They are all either totally open or totally closed. They are moved only for opening or closing the corresponding ports completely. On the other hand, the operation of the door 11 is complicated. The door 11 is not only movable between the two extreme positions thereof in which it opens one of the two air passages behind it completely, while closing the other passage completely. It is also required to take an intermediate position in which it is partly open with respect to both of the passages. Moreover, its angle of opening must be continuously variable with respect to both of the passages. As a natural consequence, a deliberately considered device is required for operating the door 11.

Referring now to FIG. 5, there is shown by way of example a conventionally available device for operating the door 11. It is a manual device. It comprises an L-shaped lever 20 and a wire 21 connected between the door 11 and the lever 20. The lever 20 is rotatable about a fixed pin 20b in either direction along an arrow line A—A in FIG. 5. The door 11 is rotatable about a pair of fixed pins 11a in either direction along an arrow line B—B. The lever 20 has one end 20c to which one end of the wire 21 is connected. The other end of the wire 21 is fastened to the door 11. The other end 20a of the lever 20 defines an actuator portion. If the actuator portion 20a is moved in either direction along the arrow line A—A, the lever 20 is rotated and its rotation is transmitted by the wire 21 to the door 11 so that the door 11 may be rotated along the arrow line B—B by an angle corresponding to the angle of rotation of the lever 20.

A large manual force is, however, required for moving the lever 20. This is particularly the case when the air conditioner is operating, since a high air pressure acts on the door 11. The manual movement of the lever 20 by overcoming the air pressure acting on the door 11 requires so large a force that the lever 20 is often difficult to move.

An electric device has, therefore, been proposed to overcome the drawback of the manual device as hereinabove described. It is constructed as shown by way of example in FIG. 6. It comprises a lever 1, an indicator panel 2, an electric motor 7, an actuator 8, a wire 10, a sliding potentiometer 22, a rotary potentiometer and a control box 24 as will hereinafter be described in further detail.

The panel 2 is provided with a temperature scale, etc. and has a slot in which the lever 1 is reciprocatively movable. The sliding potentiometer 22 is of the construction known in the art. It has a slidable member 22a to which the lever 1 is secured. It provides a certain amount of resistance which is determined by the position of its slidable member 22a, i.e., of the lever 1. It is connected to the control box 24 which contains a comparator, control circuit, etc. The motor 7 is connected to the control box 24 so that it may be rotated in either direction or stop its rotation in accordance with a signal from the control box 24. The motor 7 has an output shaft 7a to which one end of the actuator 8, which is in the form of a flat plate. is connected. The rotary potentiometer 23 has a rotative member 23a which is also connected to the output shaft 7a of the motor 7. The potentiometer 23 is of the type known in the art and is connected to the control box 24. It provides a certain amount of resistance which is determined by the angular position of its rotative member 23a, i.e., the angle of rotation of the output shaft 7a of the motor 7. The wire 10 has one end connected to the other end of the actuator 8 and the other end of the wire 10 is fastened to the door 11 to enable the rotation of the door 11 about a pair of fixed pins 11a.

The lever 1 is movable in either direction along an arrow line C—C in FIG. 6. If it is moved, the amount of resistance provided by the sliding potentiometer 22 is increased or decreased, depending on the direction in which the lever 1 has been moved. As a result, a difference appears between the amounts of resistance provided by the two potentiometers 22 and 23. This difference is detected by the comparator in the control box 24 and the control circuit transmits an appropriate signal to the motor 7 to cause it to rotate in either direction. If the motor 7 is rotated, the actuator 8 is rotated about the output shaft 7a of the motor 7 and the wire 10 is thereby moved to rotate the door 11 about the fixed pins 11a along the arrow line B—B. As the rotative member 23a of the rotary potentiometer 23 is also rotated, the amount of resistance provided by the potentiometer 23 is increased or decreased, depending on the direction of rotation of the output shaft 7a, and approaches the amount of resistance which is provided by the sliding potentiometer 22. It eventually coincides with the amount of resistance provided by the potentiometer 22. This coincidence is detected by the comparator and the control circuit in the control box 24 outputs a signal to the motor 7 to stop its rotation.

The electric device has a number of advantages. The lever 1 is easy to move by the motor 7, even if a high air pressure may act on the door 11. The device enables fine control of the temperature of the air leaving the air conditioner, as the comparator, etc. in the control box 24 make it possible to control the angular position of the door 11 precisely in accordance with the amount of sliding movement of the lever 1.

The device has, however, a number of drawbacks, too. The control box 24 is expensive and adds greatly to the cost of the device as a whole. Moreover, a serious problem occurs if the control box 24 receives a noise signal. The noise causes the comparator to work erroneously and thereby disables the angular position of the door 11 to be controlled accurately in accordance with the amount of movement of the lever 1.

SUMMARY OF THE INVENTION

It is, therefore, an object of this invention to provide an electrically controlled air conditioner which is inexpensive and yet can produce a stream of air having an accurately controlled temperature.

More specifically, it is an object of this invention to provide for an air conditioner for installation in an automobile, etc. an inexpensive device which controls electrically a door which is movable at a continuously variable angle of opening to maintain the temperature of the air produced by the air conditioner at a desired level.

These objects are attained by an air conditioner including an evaporator for cooling the air entering the air conditioner, two parallel air passages provided downstream of the evaporator for receiving cold air therefrom, one of those passages being provided with a heater, a door provided upstream of the air passages movably between a first position in which it opens one of the air passages totally and a second position in which it opens the other air passage totally, the door having a continuously variable angle of opening between its first and second positions relative to each of the air passages to vary the proportion by volume of the cold air entering one of the air passages and the cold air entering the other air passage, and a device connected to the door for moving it and maintaining it in an appropriately controlled position, characterized in that the device comprises an electric motor which is rotatable in either direction for moving the door in either direction, an electric switch connected to the motor for controlling its operation, the switch being reciprocatively slidable by a lever, a cam follower connected to the motor reciprocatively slidably in parallel to the switch for changing an electrical circuit arrangement between the switch and the motor, means for connecting the door to the motor, and means for connecting the cam follower to the motor, the switch being movable into aligned contact with the cam follower, the switch and the cam follower being connected to the motor to cause the motor to rotate in a direction for moving the cam follower toward the switch when the switch is away from aligned contact with the cam follower, while the motor stops rotation when the switch is moved into aligned contact with the cam follower.

When the device is in its original position, the switch is in aligned contact with the cam follower. If the lever is moved, the switch is moved away from its aligned contact with the cam follower to establish an electric circuit for rotating the motor in either direction, depending on the direction in which the lever has been moved. The rotation of the motor causes the movement of the door and also the movement of the cam follower which is connected to the motor by, for example, a wire. The cam follower is moved in a direction in which it approaches the switch. The rotation of the motor continues until the cam follower is moved to a position in which the switch is brought back into aligned contact with the cam follower, whereupon the switch establishes an electric circuit for stopping the rotation of the motor and the movement of the door and the cam follower, too.

The door has, therefore, a finely controlled angle of opening relative to both of the air passages in accordance with the amount of movement of the cam follower which is determined by the amount of movement of the lever. No expensive control box containing a comparator, etc., of the type as hereinbefore described, is required for controlling the door. The device of this invention is, therefore, inexpensive. It enables accurate temperature control for air delivered by the air conditioner, as it is free from any problem that may arise from the erroneous operation of a comparator.

Other features and advantages of this invention will be apparent from the following detailed description and the accompanying drawings.

BRIEF DESCRIPTION OF THE DRAWINGS

FIG. 4 is a schematic longitudinal sectional view of a typical air conditioner for an automobile;

DETAILED DESCRIPTION OF THE INVENTION

Figure 1:
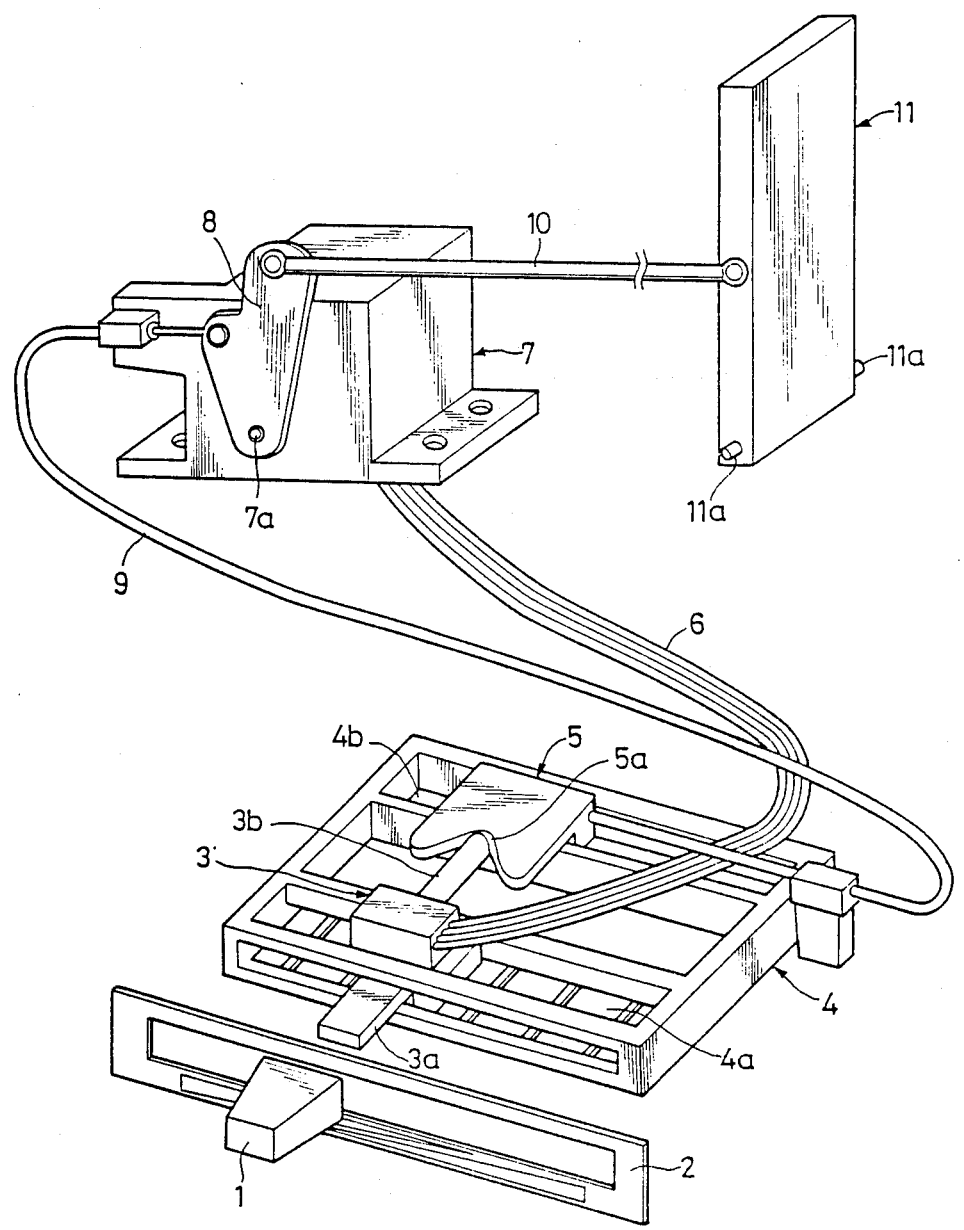
FIG. 1 is a perspective view of a device embodying this invention.

Referring to FIG. 1 of the drawings, there is shown an electrical control device embodying this invention. It includes a manual lever 1 which is reciprocatively movable to control the temperature of a stream of air which is delivered by an air conditioner. An indicator panel 2 which is provided with a temperature scale, etc. has a slot along which the lever 1 is slidable. A toggle switch 3 has at its front end a projection 3a extending through the slot of the panel 2 and connected to the lever 1 so that the toggle switch 3 may be moved if the lever 1 is moved.

The toggle switch 3 and a cam follower 5 are slidably supported by a frame 4. The frame 4 has a guide groove or slot 4a in which the toggle switch 3 is slidably disposed, and a guide groove or slot 4b which is parallel to the guide groove 4a and in which the cam follower 5 is slidably disposed. The lever 1, the toggle switch 3 and the cam follower 5 are all reciprocatively movable in parallel to one another.

The toggle switch 3 has an arm 3b projecting from its rear end remote from its front projection 3a. The cam follower 5 has at its front end a generally V-shaped concave surface 5a with which the arm 3b of the toggle switch 3 is engageable. The switch 3 is connected to an electric motor 7 by a plurality of cords 6. The arm 3b of the toggle switch 3 can be brought into a plurality of different positions by the cam follower 5 so that the switch 3 may establish an appropriate electrical circuit selectively for rotating the motor 7 in either direction or stopping its rotation, as will hereinafter be described in detail.

Figure 2A:
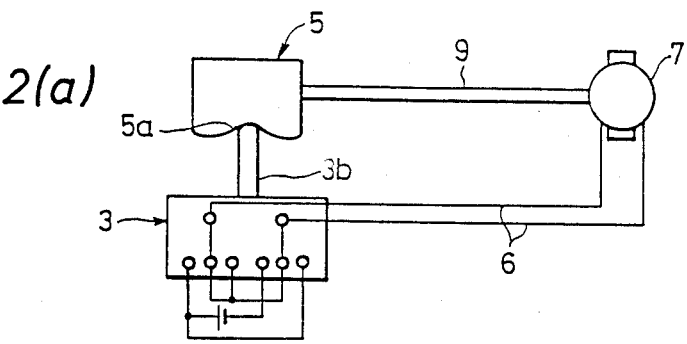
FIGS. 2(a) to 2(c) are circuit diagrams showing the electrical connections of a motor, a toggle switch and a power source in the device of FIG. 1 which are established during different stages of its operation.
Figure 2B:
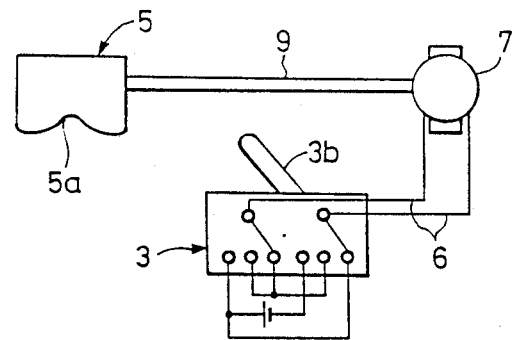
Figure 2C:
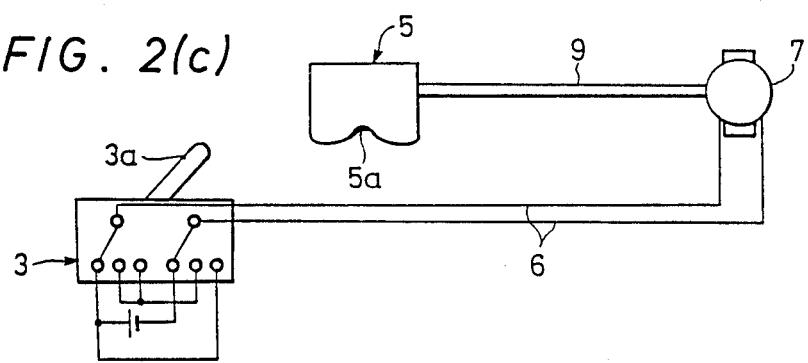

The different positions of the arm 3b and the resulting electrical circuits established by the toggle switch 3 are shown in FIGS. 2(a) to 2(c). FIG. 2(a) shows the toggle switch 3 in its OFF position. It is aligned with the cam follower 5 and its arm 3b is engaged with the concave surface 5a of the cam follower 5. No electric current is supplied to the motor 7.

The toggle switch 3 is movable in two directions away from the cam follower 5 and its arm 3b is rotatable in two opposite directions from its neutral position shown in FIG. 2(a). If the switch 3 is moved in one direction, its arm 3b is rotated by the curved surface 5a of the cam follower 5 in one direction which is opposite to the direction in which the switch 3 has been moved, as shown in FIG. 2(b). The switch 3 makes an electric circuit which enables the supply of an electric current to cause the motor 7 to rotate in one direction, or clockwise as viewed in FIG. 2(b).

If the switch 3 is moved in the other direction, its arm 3b is rotated in the other direction opposite to the direction in which the switch 3 has been moved, as shown in FIG. 2(c). The switch 3 makes an electric circuit which enables the supply of an electric current to cause the motor 7 to rotate in the other direction, or counterclockwise in FIG. 2(c).

Referring again to FIG. 1, the motor 7 has an output shaft 7a and an actuator 8 in the form of an elongated flat plate has one end connected to the output shaft 7a. A door moving wire 10 has one end connected to the other end of the actuator 8, and the other end of the wire 10 is fastened to a door 11 at the middle point of one of a pair of opposite edges thereof. A feedback wire 9 has one end connected to the actuator 8 intermediate the ends thereof and the other end of the wire 9 is connected to the cam follower 5 and extends in parallel to the guide groove 4b. The door 11 has another pair of opposite edges one of which is provided with a pair of pins 11a about which the door 11 is rotatable by the wire 10.

Figure 3A:
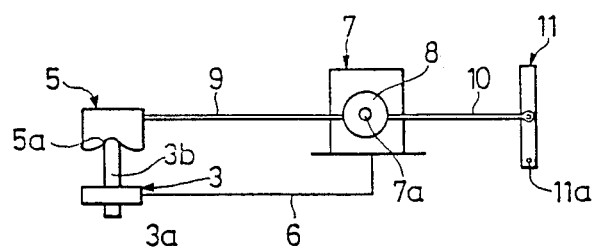
FIGS. 3(a) to 3(e) are a series of diagrammatic views showing the sequence of operation of the device shown in FIG. 1.
Figure 3B:
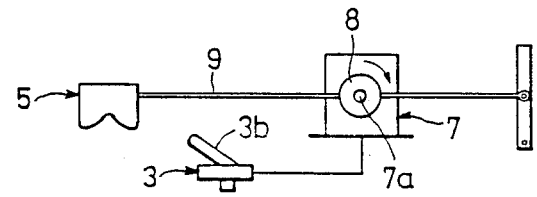
Figure 3C:
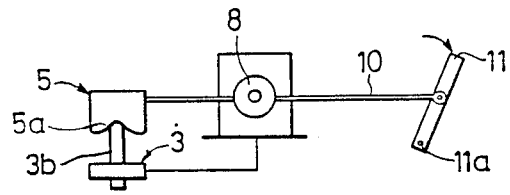

Reference is now made to FIGS. 3(a) to 3(e) showing by way of example the sequence of operation of the device which has hereinabove been described. In FIG. 3(a), the toggle switch 3 is in its OFF or neutral position in which its arm 3b is engaged with the curved surface 5a of the cam follower 5. The motor 7 is out of operation and the door 11 is in its neutral position. If the lever 1 is moved by hand to move the toggle switch 3 in one direction, or to the right as viewed in FIG. 3(a), its arm 3b is turned to the left and the motor 7 is rotated clockwise, as shown in FIG. 3(b). Therefore, the actuator 8 is also rotated clockwise and the cam follower 5 is pulled by the wire 9 to the right as viewed in FIG. 3(b). If the cam follower 5 is moved until the toggle switch 3 is aligned again with the cam follower 5, the arm 3b of the switch 3 is engaged again with the curved surface 5a of the cam follower, as shown in FIG. 3(c), whereupon the rotation of the motor 7 is stopped. Simultaneously, the actuator 8 pushes the wire 10 to the right and the wire 10 causes the door 11 to rotate to the right about the pins 11a, as shown in FIG. 3(c).

Figure 3D:
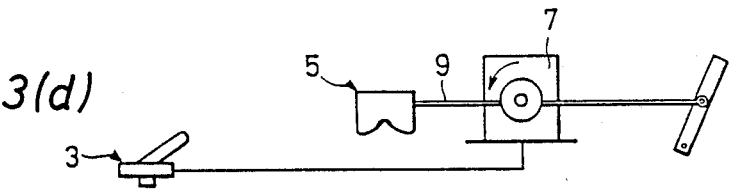
Figure 3E:
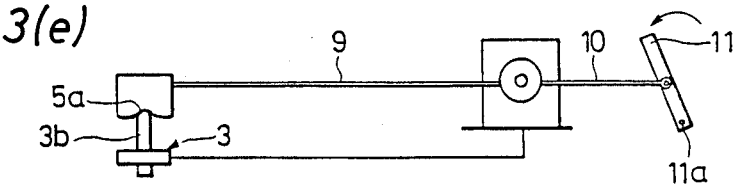
Figure 5:
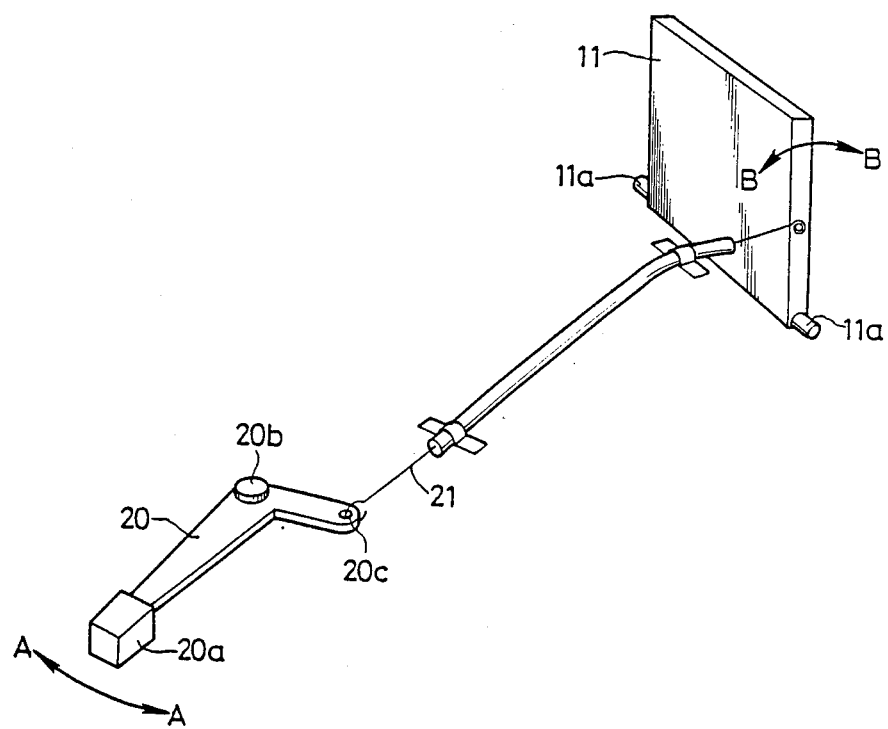
FIG. 5 is a perspective view of a conventionally available manual device for controlling a door in the air conditioner shown in FIG. 4.
Figure 6:
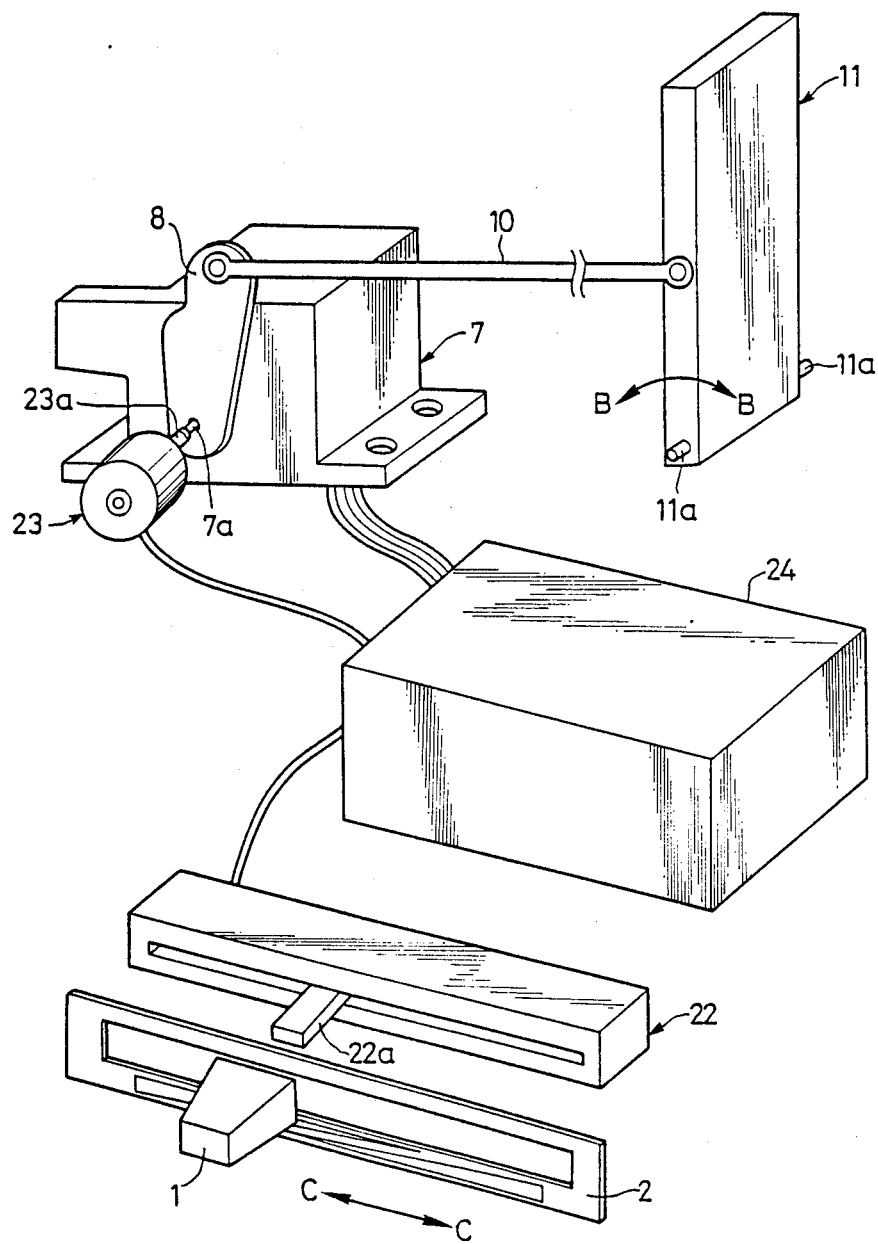
FIG. 6 is a perspective view of a conventionally available electrical device for controlling the door shown in FIG. 5.

If the lever 1 is moved to move the toggle switch 3 in the other direction, or to the left as viewed in FIG. 3(c), its arm 3b is turned to the right and the motor 7 is rotated counterclockwise, as shown in FIG. 3(d). The actuator 8 is also rotated counterclockwise and the cam follower 5 is pushed to the left until the toggle switch 3 is aligned again with the cam follower 5. The arm 3b of the switch 3 is engaged again with the curved surface 5a of the cam follower 5, as shown in FIG. 3(e), whereupon the rotation of the motor 7 is stopped. Simultaneously, the actuator 8 pulls the wire 10 and the wire 10 causes the door 11 to rotate to the left about the pins 11a, as shown in FIG. 3(e).

What is claimed is:

1. In a device for moving a door to control air flow in an air conditioner by moving the door in one or the other of two door directions to variably open and close a passage in response to setting an operating lever of a control panel to a selected control position,
    the improvement comprising:
    a switch slidably mounted in said control panel and connected to the operating lever so that it is moved therewith to a switch position corresponding to the selected control position in one or the other lateral directions of the control panel, said switch having a projecting movable switch arm;
    a cam follower slidably mounted in said control panel so as to be movable in parallel with the switch, said cam follower having a cam surface which is engageable from either direction with the switch arm of the switch;
    an electric motor having an output actuator mechanically connected by first linking means to said door for moving the door in either door direction upon rotation of the motor in either corresponding direction, said motor being electrically connected to the switch so that it is turned on to rotate the actuator in one or the other direction when the switch arm is moved from a neutral position and is turned off when the switch arm is moved to the neutral position;
    second linking means mechanically connecting the actuator of the electric motor to the cam follower for moving the cam follower to a cam position in either lateral direction of the control panel in accordance with rotation of the actuator, and
    said cam surface of the cam follower engaging the switch arm to move it to the neutral position when the cam follower is moved into alignment with the switch, and moving the switch arm from the neutral position when the switch is moved out of alignment from the cam follower, whereby when the operating lever is set to the selected control position, the switch is moved out of alignment with the cam follower to a corresponding switch position, the motor is turned on to rotate the actuator in a corresponding direction, the door and the cam follower are correspondingly moved by the actuator until the cam follower is moved back into alignment with the switch, the switch arm is thereby moved to the neutral position to turn off the motor, and the door is stopped in a position in the passage corresponding to the selected control position of the operating lever.

2. A device according to claim 1, wherein said door is positioned upstream of two downstream passages and is movable over a continuously variable angle of opening between a first position wherein it opens one downstream passage totally and a second position wherein it opens the other downstream passage totally.

3. A device as set forth in claim 1, wherein said switch is a toggle switch having a rotatable arm which is engageable with said cam follower, said arm having a neutral position in which it is engaged with said cam follower so that said switch may make an electrical circuit for causing said motor to stop rotation, a first rotated position in which said switch makes an electrical circuit for causing said motor to rotate in one direction, and a second rotated position which is located on the opposite side of said neutral position from said first rotated position, and in which said switch makes an electrical circuit for causing said motor to rotate in a direction opposite said one direction.

4. A device as set forth in claim 3, wherein said cam follower has a curved surface with which said arm is engageable, said curved surface being contoured to cause the rotation of said arm selectively from said neutral position to said first rotated position and vice versa, and from said neutral position to said second rotated position and vice versa.

* * * * *